United States Patent
Haack et al.

(10) Patent No.: US 11,162,714 B2
(45) Date of Patent: Nov. 2, 2021

(54) TEST CHAMBER AND METHOD

(71) Applicant: WEISS UMWELTTECHNIK GMBH, Reiskirchen (DE)

(72) Inventors: Christian Haack, Marburg (DE); Yannik Zahrt, Rabenau (DE); Dennis Reuschel, Giessen (DE); Andre Zinnkann, Rabenau (DE); Pascal Bellet, Ladaux (FR)

(73) Assignee: Weiss Technik GmbH, Reiskirchen (DE)

( * ) Notice: Subject to any disclaimer, the term of this patent is extended or adjusted under 35 U.S.C. 154(b) by 40 days.

(21) Appl. No.: 16/444,167

(22) Filed: Jun. 18, 2019

(65) Prior Publication Data
US 2019/0383524 A1 Dec. 19, 2019

(30) Foreign Application Priority Data
Jun. 19, 2018 (EP) .................................... 18178627

(51) Int. Cl.
*F25B 7/00* (2006.01)
*F25B 29/00* (2006.01)
(Continued)

(52) U.S. Cl.
CPC .............. *F25B 7/00* (2013.01); *F25B 29/003* (2013.01); *F25B 41/26* (2021.01); *F25B 41/31* (2021.01);
(Continued)

(58) Field of Classification Search
CPC .. F25B 7/00; F25B 41/26; F25B 41/31; F25B 29/003; F25B 49/02; F25B 2300/00;
(Continued)

(56) References Cited

U.S. PATENT DOCUMENTS 3,590,595 A * 7/1971 Briggs ...................... F25B 7/00
62/197
4,550,574 A * 11/1985 Hohman ................... F25B 5/00
62/196.3
(Continued)

FOREIGN PATENT DOCUMENTS

EP 0344397 A2 12/1989
EP 1828693 A1 9/2007
(Continued)

*Primary Examiner* — Ljiljana V. Ciric
(74) *Attorney, Agent, or Firm* — Dickinson Wright PLLC; Andrew D. Dorisio

(57) ABSTRACT

A method for conditioning a fluid in a temperature-insulated test space and a test space of a test chamber for receiving test materials. A cascading cooling device creates a particular temperature range within the test space, and the cooling device has a first cooling circuit including a cascading heat exchanger, a first compressor, a condenser and a first expanding element, and a second cooling circuit including a heat exchanger, a second compressor, the cascading heat exchanger and a second expanding element The cascading heat exchanger is cooled by the first cooling circuit, the heat exchanger is cooled by a bypass passing through the heat exchanger and bridging the cascading heat exchanger, the first compressor is turned off, and a first refrigerant is conducted and condensed in a gaseous state in the cascading heat exchanger on a low-pressure side of the bypass.

14 Claims, 1 Drawing Sheet

(51) Int. Cl.
*F25B 49/02* (2006.01)
*F25B 41/26* (2021.01)
*F25B 41/31* (2021.01)

(52) U.S. Cl.
CPC .......... *F25B 49/02* (2013.01); *F25B 2300/00* (2013.01); *F25B 2600/21* (2013.01)

(58) Field of Classification Search
CPC .............. F25B 2600/21; F25B 2400/01; F25B 2400/0409; G01N 17/002
See application file for complete search history.

(56) References Cited

U.S. PATENT DOCUMENTS

| | | | | |
|---|---|---|---|---|
| 6,161,391 A * | 12/2000 | Trieskey | ................... | F25B 5/02 62/335 |
| 6,374,621 B1 * | 4/2002 | Berchtold | ............... | F25B 9/002 62/114 |
| 6,460,355 B1 * | 10/2002 | Trieskey | ................... | F25B 7/00 62/175 |
| 6,536,518 B2 * | 3/2003 | Trieskey | ................... | F25B 7/00 165/240 |
| 8,875,528 B2 * | 11/2014 | Immink | ................... | F25B 41/20 62/150 |
| 9,267,718 B2 * | 2/2016 | Khoury | ................... | F25B 49/02 |
| 10,330,556 B2 * | 6/2019 | Furumoto | ............... | F25B 41/20 |
| 10,571,169 B2 * | 2/2020 | Haack | ................... | G01N 17/002 |
| 10,655,895 B2 * | 5/2020 | Haack | ....................... | F25B 5/04 |
| 10,656,110 B2 * | 5/2020 | Higashida | .......... | G05D 23/1919 |
| 10,883,749 B2 * | 1/2021 | Schreiber | ................. | F25B 1/04 |
| 10,921,029 B2 * | 2/2021 | Haack | ....................... | G01N 1/42 |
| 10,975,281 B2 * | 4/2021 | Aydin | ..................... | C09K 5/045 |
| 2002/0148239 A1 * | 10/2002 | Trieskey | ................. | F25B 40/02 62/79 |
| 2009/0093914 A1 * | 4/2009 | Khoury | ................... | F25B 41/22 700/282 |
| 2009/0151370 A1 * | 6/2009 | Immink | ................. | F24F 3/1405 62/122 |
| 2018/0120003 A1 * | 5/2018 | Haack | ..................... | F25B 21/02 |
| 2018/0217019 A1 * | 8/2018 | Furumoto | ........... | F25B 25/005 |
| 2018/0320933 A1 * | 11/2018 | Haack | ..................... | F25B 41/31 |
| 2019/0017949 A1 * | 1/2019 | Higashida | ................. | F25B 7/00 |
| 2019/0093926 A1 * | 3/2019 | Haack | ..................... | C09K 5/041 |
| 2019/0383524 A1 * | 12/2019 | Haack | ....................... | F25B 7/00 |
| 2019/0383713 A1 * | 12/2019 | Haack | ....................... | F25B 5/02 |
| 2020/0231854 A1 * | 7/2020 | Aydin | ..................... | C09K 5/045 |
| 2020/0231855 A1 * | 7/2020 | Aydin | ..................... | C09K 5/045 |
| 2020/0263911 A1 * | 8/2020 | Haack | ....................... | F25B 7/00 |
| 2020/0264091 A1 * | 8/2020 | Blaufelder | .............. | B01L 1/025 |
| 2020/0283665 A1 * | 9/2020 | Aydin | ..................... | F25B 9/008 |
| 2020/0283666 A1 * | 9/2020 | Aydin | ..................... | F25B 7/00 |
| 2020/0283667 A1 * | 9/2020 | Aydin | ..................... | C09K 5/045 |
| 2021/0040366 A1 * | 2/2021 | Goepfert | ................ | C09K 5/045 |

FOREIGN PATENT DOCUMENTS

EP 3584515 A1 * 12/2019 ................ F25B 7/00
WO WO2017157864 A1 9/2017

\* cited by examiner

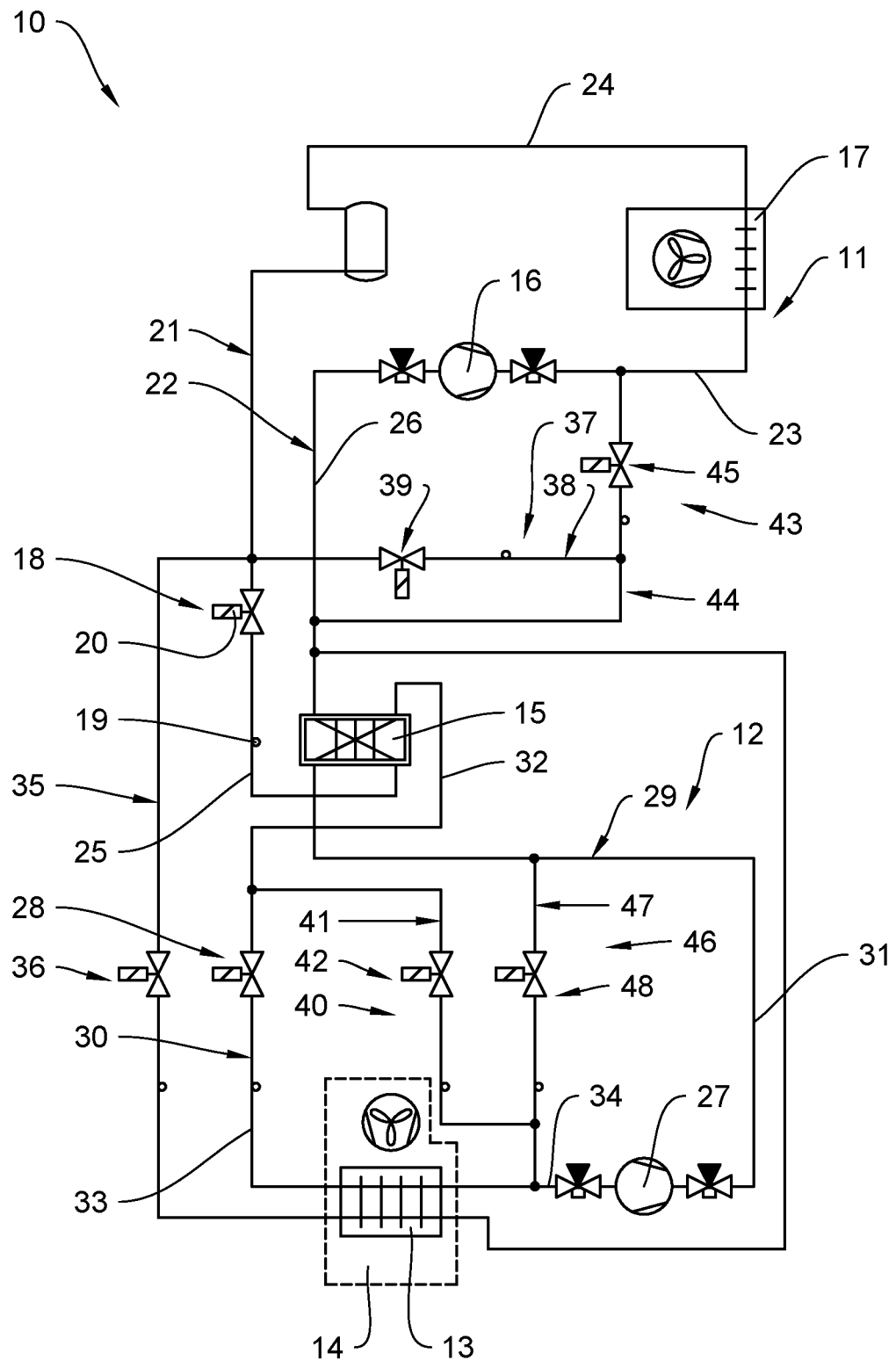

TEST CHAMBER AND METHOD

This application incorporates by reference the disclosure of European Patent Application No. 18178627.8 filed on Jun. 19, 2018.

FIELD OF THE INVENTION

The invention relates to a method and a test chamber for conditioning a fluid, particularly air, comprising a temperature-insulated test space for receiving test materials, said test space being sealable against an environment, a temperature ranging from −60° C. to +180° C. in temperature being realized within the test space by means of a cascading cooling device of a temperature control device of the test chamber, having a first cooling circuit having a first refrigerant, a cascading heat exchanger, a first compressor, a condenser and a first expanding element, and having a second cooling circuit having a second refrigerant, a heat exchanger arranged in the test space, a second compressor, the cascading heat exchanger and a second expanding element, said cascading heat exchanger being cooled by the first cooling circuit.

BACKGROUND OF THE INVENTION

Such test chambers are commonly used for testing physical and/or chemical properties of objects, in particular devices. Therefore, temperature test chambers or climate test chambers are known within which temperatures ranging from −60° C. to +180° C. can be set. In climate test chambers, desired climate conditions can be additionally set to which the device or rather test materials will be exposed for a defined period of time. Such test chambers are regularly or partially realized as a mobile apparatus which is connected to a building using only required supply lines and comprise all necessary structural components for controlling the temperature and conditioning. A temperature of a test space, which receives the test materials to be tested, is regularly controlled in an air circulation duct within the test space. The air circulation duct forms an air treatment space in the test space in which heat exchangers for heating or cooling the air flowing through the air circulation duct or the test space, respectively, are arranged. For this purpose, a fan or a ventilator suctions the air present in the test space and conducts it in the air circulation duct to the corresponding heat exchangers or vice versa. The test materials can thus be controlled in temperature or even be exposed to a defined change in temperature. During a test interval, a temperature can repeatedly alternate between a temperature maximum and a temperature minimum of the test chamber, for example. Such a test chamber is known from EP 0 344 397 A1, for example.

Due to the high requirements for a temperature control within the temperature range of the test chamber, fluctuations regularly occur in a load requirement while the test chamber is in operation. A refrigerating capacity generated by the corresponding compressor and expanding element must therefore be able to be adjusted continuously. Nevertheless, it is desirable for the compressor, for example, to not be turned on and off too often in order to prolong a service life of the compressor. This requirement is regularly solved by a tube section having another adjustable expanding element being formed between a high-pressure side and a low-pressure side of a cooling circuit, a refrigerating capacity being able to be led back past the heat exchanger or cascading heating exchanger to the corresponding compressor via the expanding element. In this needs-based distribution of a mass flow caused by the respective compressor in the corresponding cooling circuit, slight differences in temperature between an actual temperature and a set temperature can be compensated in the heat exchanger or the cascading heat exchanger, respectively, without having to result in disadvantageous loading conditions in the corresponding compressors. In this context, however, it is disadvantageous for a compressor to always have to be in operation when there is a slight difference in temperature present in the heat exchanger, no matter how large the difference in temperature to be compensated by the cooling device is. The full refrigerating capacity of the compressor must be made available for a cooling requirement of only <1% of a total capacity, for example, in order to be able to maintain the required set temperature in the heating exchanger. A majority of the refrigerating capacity is then led back to the corresponding compressor via the tube section. Since continually turning the compressor on and off is not possible and a fan has to be operated at the condenser also if need be, the cascading cooling device also consumes a comparatively large amount of energy for slight differences in temperature, which are to be compensated in the heat exchanger, using the known operating method described above.

SUMMARY OF THE INVENTION

The object of the invention at hand is to propose a test chamber and a method for conditioning air in a test space of a test chamber by means of both of which the test chamber can be operated in an energy-efficient manner.

The method for conditioning a fluid, particularly air according to the invention comprises a temperature-insulated test space for receiving test materials, said test space being sealable against an environment, a temperature ranging from −60° C. to +180° C. in temperature being realized within the test space by means of a cascading cooling device of a temperature control device of the test chamber, having a first cooling circuit having a first refrigerant, a cascading heat exchanger, a first compressor, a condenser and a first expanding element, and having a second cooling circuit having a second refrigerant, a heat exchanger arranged in the test space, a second compressor, the cascading heat exchanger and a second expanding element, said cascading heat exchanger being cooled by the first cooling circuit, said heat exchanger being subsequently cooled by a bypass of the first cooling circuit by means of the first cooling circuit, said bypass passing through the heat exchanger and bridging the cascading heat exchanger, said first compressor being turned off, said first refrigerant being conducted and condensed in a gaseous state in the cascading heat exchanger on a low-pressure side of the bypass.

In the method according to the invention, a temperature exchange with an environment of the test space is mostly prevented via a temperature insulation of side walls, bottom walls and top walls of the test chamber. The heat exchanger is connected to or is integrated in the second cooling circuit so that the second refrigerant circulating in the second cooling circuit flows through the heat exchanger. The heat exchanger of the second cooling circuit is arranged in the test space or rather in an air treatment space of the test space. Since the cascading cooling device comprises two cascading cooling circuits, the second cooling circuit is coupled to the first cooling circuit via the cascading heat exchanger in such a manner that the cascading heat exchanger serves as a condenser for the second cooling circuit. The first and the second cooling circuit each comprise the first and the second compressor, respectively. In the first cooling circuit, the condenser for the compressed first refrigerant is arranged in the flow direction of the first refrigerant downstream of the first compactor. The compressed first refrigerant, which is highly-pressurized after being compressed and is essentially gaseous, is condensed in the condenser and is then available in an essentially liquid state. The liquified first refrigerant continues to flow through the first expanding element, wherein it becomes gaseous again through expansion due to a drop in pressure. Hence, the liquid first refrigerant flows through the cascading heat exchanger which is cooled by this. Subsequently, the gaseous first refrigerant is suctioned and compressed again by the first compressor. The second cooling circuit is operated corresponding to the first cooling circuit, with the cascading heat exchanger serving as the condenser instead of using the condenser of the first cooling circuit in this instance, said cascading heat exchanger itself being cooled by the first cooling circuit. An expanding element is understood to be at least an expansion valve, a throttle, throttle valves or a different, suitable constriction of a fluid line.

In the invention at hand, it is intended to cool the heat exchanger by means of the bypass of the first cooling circuit passing through the heat exchanger and bridging the cascade heat exchanger. Depending on the temperature requirements, the heat exchanger can then be cooled either via a combination of the first cooling circuit and the second cooling circuit or only via the first cooling circuit. A refrigeration using both cooling circuits is intended if particularly low temperatures are not to be attained, with the second compressor being able to be put out of operation in this instance. It becomes possible to save energy when operating the test space through this measure alone.

Since the cascading heat exchanger is basically always cooled when the first compressor is in operation, even if only a small refrigerating capacity is required in the heat exchanger, the first refrigerant or rather the mass flux of compressed refrigerant can be conducted through the cascading heat exchanger before redirecting the mass flow via a tube section upstream of the compressor. Though the first refrigerant is then also resupplied to the first compressor, it is possible to store cooling energy in the cascading heat exchanger or the second cooling circuit, when it is not required. The thermal energy found in the compressed first refrigerant can then be emitted to the cascading heat exchanger or, respectively, thermal energy can be deducted from the cascading heat exchanger in such a manner that a refrigerating capacity is stored in the cascading heat exchanger. Instead of the heat exchanger, the cascading heat exchanger can consequently be cooled or supplied with refrigerating capacity via the bridging bypass. If the first compressor is turned off, this refrigerating capacity can be guided back to the low-pressure side by means of the first refrigerant via the way it came, thus enabling turning the first compressor off early.

If the first compressor is turned off, gaseous refrigerant on the low-pressure side of the first cooling circuit in the flow direction upstream of the first compressor can be conducted in the cascading heat exchanger via the bypass, the first refrigerant being condensed in the cascading heat exchanger due to the refrigerating capacity or the low thermal energy, respectively, stored there. A pressure on the low-pressure side of the first cooling circuit drops due to the decreasing density of the first refrigerant, which was increased because of the condensation. Since a condensation pressure in the bridging bypass has changed only marginally after turning off the first compressor, a difference in pressure is still present in the bypass upstream of the heat exchanger, said difference in pressure being able to be used for cooling the heat exchanger. It is essential to enable turning off the first compressor and possibly a fan on the condenser early, a set temperature in the heat exchanger still being able to be maintained or, respectively, a difference in temperature being able to be compensated for a certain period of time. The unrequired refrigerating capacity generated by the first compressor can be intermediately stored in the cascading heat exchanger and be emitted again by condensing the first refrigerant. Due to the thus decreased operating times of the first and the second compressor, the test chamber can be operated in a particularly energy-efficient manner.

An adjustable third expanding element can be arranged in the bypass and, in the first cooling circuit, liquid first refrigerant from a high-pressure side of the first cooling circuit can be expanded to a gaseous first refrigerant by means of the third expanding element and be conducted to the low-pressure side via the heat exchanger. It thus also becomes possible to evaporate liquid first refrigerant from the high-pressure side via the third expanding element in such a manner that the first refrigerant is conducted into the heat exchanger, which is cooled thereby, in a renewed gaseous state through expansion due to a drop in pressure. The gaseous first refrigerant flowing out of the heat exchanger has a higher temperature level as a consequence of the refrigerating capacity emitted in the heat exchanger can be conducted to the first compressor again. The bypass can basically be operated independently of an operation of the second cooling circuit or the second compressor, respectively. If the second cooling circuit of the second refrigerant is realized for a comparatively low temperature level, it can also be intended to turn off the second compressor and to operate or to also turn off the first compressor.

The second compressor can be stopped or turned off in a first step, the first compressor being able to be operated and condenses first refrigerant from a high-pressure side of the first cooling circuit being able to be expanded to gaseous first refrigerant by means of the first expanding element when in the first cooling circuit and being able to be conducted to the low-pressure side via the cascading heat exchanger. Thus, a refrigerating capacity not required in the heat exchanger can still be conducted from the high-pressure side of the first cooling circuit to the cascading heat exchanger via the first expanding element and be evaporated there, thermal energy of the cascading heat exchanger being able to be emitted to the first refrigerant. This leads to a refrigeration of the cascading heat exchanger, through which the second refrigerant no longer flows due to the second compressor being turned off.

Since, however, the second refrigerant is still in the cascading heat exchanger, thermal energy from the second refrigerant of the second cooling circuit can be emitted to the first refrigerant of the first cooling circuit and be stored in the cascading heat exchanger. The second refrigerant can store refrigerating capacity by acting like a kind of storage medium. Storing refrigerating capacity in the cascading heat exchanger is particularly logical if little refrigerating capacity is required in the heat exchanger, which is simultaneously cooled by the bypass if necessary. Thermal energy is understood to be heat energy or also heat content in Joule, a supply of heat increasing thermal energy while dissipating heat prevents this. Thus, the cascading heat exchanger can also store thermal energy in such a manner that a refrigerating capacity can be stored by dissipating heat.

Subsequently, the first compressor can be turned off in a second step, a difference in pressure between the low-pressure side and the high-pressure side of the first cooling circuit being able to be realized in the cascading heat exchanger by condensing the first refrigerant to liquid first refrigerant. This presupposes that the cascading heat exchanger has been cooled enough or has stored so little thermal energy that the gaseous first refrigerant can condense. For this purpose, it can be intended for the cascading heat exchanger to have been cooled enough until a significant difference in temperature can be attained through cooling. By condensing the first refrigerant in the cascading heat exchanger and by realizing the difference in pressure between the low-pressure side and the high-pressure side of the first cooling circuit, draining the first refrigerant via the bypass can be ensured at least for so long as condensing the first refrigerant in the cascading heat exchanger is possible or the cascading heat exchanger has not been filled with liquid first refrigerant.

In the first cooling circuit, liquid first refrigerant from the high-pressure side of the first cooling circuit can be expanded to gaseous first refrigerant by means of the third expanding element via the difference in pressure and be conducted to the low-pressure side via the heat exchanger. The cascading heat exchanger can be used as a kind of cold sink. By transferring thermal energy from the first refrigerant to the cascading heat exchanger, the second refrigerant or rather the storage medium is reheated, the second refrigerant is evaporated and the first refrigerant is cooled, which leads to its condensation. If condensing the first refrigerant in the cascading heat exchanger is not possible due to a slight difference in temperature between the first refrigerant and the second refrigerant or if the cascading heat exchanger is filled with liquid first refrigerant, the first compressor can be operated again. The first refrigerant can then change the flow direction in the cascading heat exchanger and can evaporate again due to a difference in pressure set because of the operation of the compressor and be suctioned by the first compressor.

First refrigerant can be supplied to the low-pressure side via the fourth expanding element by means of an adjustable first internal supplementary refrigeration line in the first cooling circuit, having a second bypass, which is connected to a high-pressure side in the flow direction upstream of the first expanding element and downstream of the condenser and is connected to the low-pressure side in the flow direction upstream of the first condenser and downstream of the cascading heat exchanger, and by means of an adjustable fourth expanding element. Via the second bypass or the fourth expanding element, respectively, first refrigerant can be dosed such that a suction gas temperature and/or a suction gas pressure of the first refrigerant can be adjusted on the low-pressure side of the first cooling circuit upstream of the first compressor. Through this, it can be prevented among other things that the first compressor might overheat and thus becomes damaged. By actuating the fourth expanding element, gaseous first refrigerant upstream of the first compressor can consequently be cooled via the second bypass by adding still liquid first refrigerant in doses. The fourth expanding element can be actuated by an adjusting device, which itself is coupled to a pressure and/or temperature sensor in the first cooling circuit upstream of the first compressor. It is particularly advantageous if a suction gas temperature of <30° C., advantageously of <40° C., can be set via the second bypass. First refrigerant can be conducted past the cascading heat exchanger via the second bypass in order to delay the first compressor from being turned off automatically or to prolong an operating period of the first compressor. Furthermore, it becomes possible to dynamically supply the cascading heat exchanger with first refrigerant or, depending on the loading condition at hand, to supply excess liquid first refrigerant, which is not required for cooling a suction gas temperature, to the cascading heat exchanger or the heat exchanger while operating the first compressor.

Furthermore, second refrigerant can be supplied to the low-pressure side via the fifth expanding element by means of an adjustable second internal supplementary refrigeration line in the second cooling circuit, having a third bypass, which is connected to a high-pressure side in the flow direction upstream of the second expanding element and downstream of the cascading heat exchanger and is connected to the low-pressure side in the flow direction upstream of the second compressor and downstream of the heat exchanger, and by means of an adjustable fifth expanding element. An improved operation, as has been described above for the first internal supplementary refrigeration, can also be attained for the second cooling circuit.

First refrigerant can be supplied to the low-pressure side via the sixth expanding element by means of an adjustable first back-injection device for first refrigerant in the first cooling circuit, having a fourth bypass, which is connected to a high-pressure side in the flow direction downstream of the first compressor and upstream of the condenser and is connected to the low-pressure side in the flow direction upstream of the first compressor and downstream of the cascading heat exchanger, and by means of an adjustable sixth expanding element. After a recondensation of the first refrigerant in the cascading heat exchanger on the low-pressure side, the first compressor must be put back into operation if the recondensation can no longer occur due to an increasing temperature in the cascading heat exchanger. Due to the dropping vapor pressure, the first refrigerant evaporates in the cascading heat exchanger and a flow direction of the first refrigerant changes in the cascading heat exchanger. In this context, it would be disadvantageous if first refrigerant recondensed by the first compressor in the cascading heat exchanger is suctioned. This can be prevented by the fourth bypass or rather the first back-injection device realized thus supplying hot gaseous first refrigerant to the low-pressure side upstream of the first compressor and thus promotes an evaporation of the liquid first refrigerant collected in the cascading heat exchanger. Nevertheless, it is possible to set a suction gas temperature and/or a suction gas pressure upstream of the first compressor via the first back-injection device. The first back-injection device can form a so called hot gas bypass.

Furthermore, second refrigerant can be supplied to the low-pressure side via the seventh expanding element by means of an adjustable back-injection device for second refrigerant in the second cooling circuit, having a fifth bypass, which is connected to a high-pressure side in the flow direction downstream of the second compressor and upstream of the cascading heat exchanger and is connected to the low pressure side in the flow direction upstream of the second compressor and downstream of the heat exchanger, and by means of an adjustable seventh expanding element. As described above for the first re-injection device, the second cooling circuit can be operated advantageously.

It is particularly advantageous if a suction gas temperature and/or a suction gas pressure of the first and/or second refrigerant from the corresponding low-pressure side of the cooling circuits can be adjusted upstream of the corresponding compressors, and/or that a difference in pressure can be compensated between the corresponding high-pressure side and the corresponding low-pressure side of the cooling circuits. Among other things, it can thus be prevented that the corresponding compressor might overheat and thus becomes damaged. It is particularly advantageous if a suction gas temperature of <30° C., advantageously of <40° C., can be set. The corresponding refrigerant can also be dosed such that an operating period of the corresponding compressor can be adjusted. Basically, it is disadvantageous if the compressor is often turned on or off. A service life of a compressor can be prolonged if it is in operation for longer periods at a time. Nevertheless, it is also possible to turn off the compressor for longer periods at a time.

The temperature control device can comprise a regulating device having at least one pressure sensor and/or at least one temperature sensor in the corresponding cooling circuits, magnetic valves of expanding elements being able to be actuated by means of the regulating device as a function of a measured temperature or pressure. The regulating device can comprise means for data processing which process data sets from sensors and control the electrically controlled valves. Regulating a functionality of the cascading cooling device can then also be adapted to the correspondingly used refrigerant, for example via a corresponding computer program. Furthermore, the regulating device can signal a malfunction and cause the test chamber to be turned off, if necessary, in order to keep the test chamber or the test materials from being damaged by critical or undesired operating conditions of the test chamber.

If the expanding element is realized as a throttle having a electrically driven valve, such as a magnetic valve, refrigerant can be dosed via the throttle and the magnetic valve. The throttle can then be an adjustable valve or a capillary, via which refrigerant can be conducted by means of the magnetic valve. The magnetic valve in turn can be actuated by means of the regulating device.

A temperature ranging from −70° C. to +180° C. in temperature, preferably from −80° C. to +180° C., can be realized within the test chamber by means of the temperature control device. It is essential that a temperature ranging from >+60° C. to +180° C. in temperature can be reduced within the test space by means of the temperature control device. The corresponding refrigerants are heated considerably in the heat exchanger using the comparatively high temperature in the test space, for which reason, from a technical point of view, a design of the first and the second cooling circuit can be adapted to a refrigerant heated to this temperature range at least on a low-pressure side of the corresponding cooling circuit. A refrigerant heated thus can otherwise no longer be ideally used on the high-pressure side of the corresponding cooling circuit.

The test chamber for conditioning a fluid, particularly air according to the invention comprises a temperature-insulated test space sealable against an environment for receiving test materials and a temperature control device for controlling the temperature of the test space, a temperature ranging from −60° C. to +180° C. being able to be realized within the test space by means of the temperature control device, said temperature control device comprising a cascading cooling device having a first cooling circuit having a first refrigerant, a cascading heat exchanger, a first compressor, a condenser and a first expanding element, and having a second cooling circuit having a second refrigerant, a heat exchanger arranged in the test space, a second compressor, the cascading heat exchanger and a second expanding element, said cascading heat exchanger being able to cooled by means of the first cooling circuit, said first cooling circuit being realized having a bypass passing through the heat exchanger and bridging the cascading heat exchanger, said heat exchanger being able to be cooled by means of the first cooling circuit, and said temperature control device comprising a regulating device, by means of which the first compressor can be turned off and the first refrigerant can be conducted and condensed in the cascading heat exchanger on a low-pressure side of the bypass in a gaseous state.

The description of advantages of the method according to the invention is referred to for deriving the advantages of the test chamber according to the invention. Overall, a thermal efficiency of the cascading cooling device can be increased, whereby a significant amount of energy can be saved. By not operating the first and the second compressor, the heat exchanger can be cooled for a comparatively longer period of time via the bypass and the third expanding element respectively. Besides turning off the first compressor, it is also possible to also turn off other components of the cascading cooling device, such as a fan of the condenser, or to turn off a water cooling in a water-cooled condenser. Furthermore, the cascading cooling device can be regulated more precisely using the turned off compressors since pressure and temperature conditions in the first and second cooling circuit are not negatively influenced by the compressors. The heat exchanger arranged in the test space can also be arranged in an air treatment space of the test space so that air circulated by a fan can come into contact with the heat exchanger. It thus becomes possible to directly cool an amount of circulated air of the test space via the heat exchanger by means of the cascading cooling device.

Consequently, the first cooling circuit can be thermally coupled to the second cooling circuit by means of the cascading cooling device. The first cooling circuit can then be a high-temperature cooling circuit and the second cooling circuit can be a low-temperature cooling circuit. In particular, it can be intended to only use the second cooling circuit if a temperature ranging from −70° C. to −20° C. in temperature is to be realized within the test space. Only using the first cooling circuit or rather turning off the second compressor becomes possible if a temperature of >−20° C. is to be realized within the test space.

The cascading heat exchanger can be formed by a plate heat exchanger whose primary side can be connected to the first cooling circuit and whose secondary side can be connected to the second cooling circuit. The first refrigerant can then flow through the primary side and the second refrigerant can flow through the secondary side. If the second compressor is turned off, the second refrigerant is no longer transported on the secondary side and can serve as a storage medium. For this purpose, it can also be intended to provide the second cooling circuit with suitable means which can compensate a rise or drop or in pressure by changing the density or the temperature of the storage medium.

The bypass can be connected to a high-pressure side of the first cooling circuit in a flow direction upstream of the first expanding element and downstream of the first condenser and be connected to the low-pressure side of the first cooling circuit in a flow direction upstream of the first compressor and downstream of the cascading heat exchanger.

The temperature control device can comprise a heating device having a heater and a heating heat exchanger in the test space. The heating device can be an electric resistance heater, for example, which heats the heating heat exchanger in such a manner that an increase in temperature in the test space is enabled via the heating heat exchanger. If the heat exchanger and the heating heat exchanger can be specifically controlled for cooling and heating the air, which is circulated in the test space, by means of the regulating device, a temperature, which ranges in the previously indicated temperature range, can be realized within the test space by means of the temperature control device. In this context, a temporal consistency in temperature of ±1 K, preferably <±0.3 K to ±0.5 K, can be realized during a test interval in the test space independently of the test materials or rather an operating condition of the test materials. A test interval is understood to be a time segment of a complete test period in which the test materials are exposed to an essentially consistent temperature or climate condition. The heating heat exchanger can be combined with the heat exchanger of the first and second cooling circuit in such a manner that a shared heat-exchanger body is formed through which the first and second refrigerant can flow and which comprises heating elements of and electric resistance heater. The condenser of the first cooling circuit can be realized having an air cooling or water cooling or a different cooling liquid. Generally, the condenser can be cooled using any suitable liquid. It is essential that the thermal load occurring at the condenser is dissipated via the air cooling or water cooling in such a manner that the first refrigerant can condense such that it becomes fully liquefied.

BRIEF DESCRIPTION OF THE DRAWING FIGURE

In the following, a preferred embodiment of the invention is further described with reference to the attached drawing.

The FIGURE illustrates a schematic view of a cascading cooling device 10 having a first cooling circuit 11 and a second cooling circuit 12. Furthermore, the cascading cooling device 10 comprises a heat exchanger 13 which is arranged in an indicated test space 14 and is connected to the first cooling circuit 11 and the second cooling circuit 12.

DETAILED DESCRIPTION OF THE INVENTION

The first cooling circuit 11 is realized having a cascading heat exchanger 15, a first compressor 16, a condenser 17 and a first expanding element 18. In the first cooling circuit 11, a first refrigerant can be circulated by operating the first compressor 16. The first expanding element 18 is made of a throttle 19 and a magnetic valve 20. All other expanding elements of the cascading cooling device 10 can be realized accordingly. The first cooling circuit 11 comprises a high-pressure side 21, which passes from the first compressor 16 to the first expanding element 18 in the flow direction of the first refrigerant, as well as a low-pressure side 22, which passes from the first expanding element 18 to the first compressor 16. The first refrigerant is gaseous and has a comparatively high temperature in a tube section 23 extending from the first compressor 16 to the condenser 17. The first refrigerant, which is compressed by the first compressor 16, streams in the first cooling circuit 11 to the condenser 17, said gaseous first refrigerant being liquefied in the condenser 17. The expanding element 18 comes after the condenser 17 in the first cooling circuit 11 in the flow direction of the first refrigerant, said first refrigerant accordingly being available in a liquid state in a tube section 24 of the first cooling circuit 11 between the condenser 17 and the first expanding element 18. By expanding the first refrigerant downstream of the first expanding element 18, the cascading cooling device 15 is cooled, the first refrigerant transitioning to the gaseous state in a tube section 25 between the first expanding element 18 and the cascading heat exchanger 15 and being conducted to the first compressor 16 via a tube section 26 of the cascading heat exchanger 15.

The second cooling circuit 12 comprises the heat exchanger 13, a second compressor 27, the cascading heat exchanger 15 and a second expanding element 28 exchanger. The second cooling circuit 12 comprises a high-pressure side 29, which passes from the second compressor 27 to the second expanding element 28 in the flow direction of a second refrigerant, as well as a low-pressure side 30, which passes from the second expanding element 28 to the second compressor 27. Here as well, the second refrigerant is gaseous in a tube section 31 extending from the second compressor 27 to the cascading heat exchanger 15 and has a comparatively high temperature. The second refrigerant, which is compressed by the second compressor 27, flows in the second cooling circuit 12 to the cascading heat exchanger 15, said gaseous second refrigerant being liquefied in the cascading heat exchanger 15. In the second cooling circuit 12, the second expanding element 28 comes after the cascading heat exchanger 15 in the flow direction of the second refrigerant, said second refrigerant accordingly being available in the liquid state in a tube section 32 of the second cooling circuit 12 between the cascading heat exchanger 15 and the second expanding element 28. By expanding the second refrigerant downstream of the second expanding element 28, the heat exchanger 13 is cooled, said second refrigerant transitioning to the gaseous state in a tube section 33 between the second expanding element 28 and the heat exchanger 13, particularly in the heat exchanger 13, and being conducted to the second compressor 27 from the heat exchanger 13 via a tube section 34.

In the first cooling circuit 11, a bypass 35 is formed which passes through the heat exchanger 13 and bridges the cascading heat exchanger 15 of the cooling circuit 11. The bypass 35 is connected to the high-pressure side 21 in a flow direction upstream of the first expanding element 18 and downstream of the condenser 17 and is connected to the low-pressure side 22 in a flow direction upstream of the first compressor 16 and downstream of the cascading heat exchanger 15. Furthermore, an adjustable third expanding element 36 is arranged in the bypass 35 in the flow direction upstream of the heat exchanger 13. By means of the third expanding element 36, the first refrigerant can be expanded and be conducted to the low-pressure side 22 via the heat exchanger 13. As long as no particularly low temperatures have to be realized in the heat exchanger 13, the second cooling circuit 12 can be turned off using the second compressor 27 so that the heat exchanger 13 can be cooled via the bypass 35 of the first cooling circuit 11.

In this instance, the first expanding element 18 remains closed since the cascading heat exchanger 15 does not need to be cooled.

Nevertheless, the first refrigerant can be conducted from the high-pressure side 21 via the first expanding element 18 through the cascading heat exchanger 15 to the low-pressure side 22, if the second compressor 27 is stopped and the first compressor 16 is in operation, said cascading heat exchanger 15 or rather the second refrigerant therein from the second cooling circuit then being cooled. Since the second refrigerant is not circulated, the cascading heat exchanger 15 serves as a cold reservoir or rather thermal energy is emitted from the second refrigerant to the first refrigerant and thus a cold capacity is stored in the cascading heat exchanger 15. If, by means of the first cooling circuit 11, a comparatively low cold capacity is to be yielded in the heat exchanger 13 via the bypass or rather a difference in temperature to be compensated is comparatively slight, the first compressor 16 can be turned off also. The first refrigerant can then flow in the cascading heat exchanger 15 and condense in the cascading heat exchanger 15, a difference in pressure between the low-pressure side 22 and the high-pressure side 21 of the first cooling circuit 11 being maintained owing to a thus realized change in density of the refrigerant. This leads to first refrigerant continuing to flow via the third expanding element 36 and to the heat exchanger 13 being cooled until the first refrigerant can no longer be condensed in the cascading heat exchanger 15 even when the first condenser 16 is turned off. Subsequently, the first compressor 16 can be operated again, a pressure dropping enough in the cascading heat exchanger 15 so that the liquefied first refrigerant becomes gaseous again and thus is suctioned from the cascading heat exchanger 15. Overall, a significant amount of energy can thus be saved when operating the cascading cooling device 10.

Furthermore, an adjustable first internal supplementary refrigeration line is arranged in the first cooling circuit 11, said first internal supplementary refrigeration 37 being realized having a second bypass 38, which is connected to the high-pressure side 21 in the flow direction upstream of the first expanding element 18 and downstream of the condenser 17 and is connected to the low-pressure side 22 in the flow direction upstream of the first compressor 16 and downstream of the cascading heat exchanger 15 having an adjustable fourth expanding element 39. The first refrigerant can be supplied to the low-pressure side 22 via the fourth expanding element 39 so that the first refrigerant can lower a suction gas temperature upstream of the first compressor 16.

The second cooling circuit 12 also comprises an adjustable second internal supplementary refrigeration line 40 having a third bypass 41 between the high-pressure side 29 and the low-pressure side 30 having a fifth expanding element 42. In this instance as well, the second refrigerant can be cooled upstream of the second compressor 27 by means of the second internal supplementary refrigeration 40 if required.

The first cooling circuit 11 further comprises an adjustable first back-injection device 43 for the first refrigerant having a fourth bypass 44, which is connected to the high-pressure side 21 in the flow direction downstream of the first compressor 16 and upstream of the condenser 17 and is connected to the low-pressure side 22 in the flow direction upstream of the first compressor 16 and downstream of the cascading heat exchanger 15. A sixth expanding element 45 is arranged in the fourth bypass 44, hot and gaseous first refrigerant being able to be supplied from the high-pressure side 21 to the low-pressure side 22 by means of said sixth expanding element 45 whereby a suction gas temperature and/or a suction gas pressure of the first refrigerant becoming adjustable on the low-pressure side 22 upstream of the first compressor 16. Moreover, a difference in pressure can be compensated between the high-pressure side 21 and the low-pressure side 22.

The second cooling circuit 12 also comprises a second adjustable back-injection device 46 having a fifth bypass 47 and a seventh expanding element 48, via which hot and gaseous second refrigerant can be conducted from the high-pressure side 29 to the low-pressure side 30.

The invention claimed is:

1. A method for conditioning a fluid in a temperature-insulated test space (14) of a test chamber for receiving test materials, said test space (14) being sealable against an environment and having a temperature ranging from −60° C. to +180° C. realized within the test space by a cascading cooling device (10) of a temperature controller of the test space, the test space having a first cooling circuit (11) having a first refrigerant, a cascading heat exchanger (15), a first compressor (16), a condenser (17) and a first expander (18), and having a second cooling circuit (12) having a second refrigerant, a heat exchanger (13) arranged in the test space, a second compressor (27), the cascading heat exchanger and a second expander (28), said cascading heat exchanger being cooled by the first cooling circuit, wherein the method comprises cooling the heat exchanger by a bypass (35) of the first cooling circuit by the first cooling circuit, said bypass passing through the heat exchanger and bridging the cascading heat exchanger, the first compressor being turned off, the first refrigerant being conducted and condensed in a gaseous state in the cascading heat exchanger on a low-pressure side (22) of the bypass.

2. The method according to claim 1, wherein a expander (36) is arranged in the bypass (35) and liquid first refrigerant from a high-pressure side (21) of the first cooling circuit is expanded to gaseous first refrigerant in the first cooling circuit (11) by the third expander and is conducted to the low-pressure side (22) via the heat exchanger (13).

3. The method according to claim 2, wherein the second compressor (27) is stopped in a first step, the first compressor (16) being operated for condensing first refrigerant from a high-pressure side (21) of the first cooling circuit being expanded to gaseous first refrigerant in the first cooling circuit (11) by the first expander (18) and being conducted to the low-pressure side (22) via the cascading heat exchanger.

4. The method according to claim 3, wherein thermal energy is emitted from the second refrigerant of the second cooling circuit (12) to the first refrigerant of the first cooling circuit (11) and is stored in the cascading heat exchanger (15).

5. The method according to claim 3, wherein the first compressor (16) is turned off in a second step, and a difference in pressure is realized in the cascading heat exchanger (15) between the low-pressure side (22) and the high-pressure (21) by the first refrigerant condensing to the liquid first refrigerant.

6. The method according to claim 5, wherein liquid first refrigerant from the high-pressure side (21) of the first cooling circuit is expanded to gaseous first refrigerant in the first cooling circuit (11) by a third expander (36) and is conducted to the low-pressure side (22) via the heat exchanger (13).

7. The method according to claim 5, wherein the first compressor (16) is operated in a third step, and a pressure on the low-pressure side (22) is reduced enough for the liquid first refrigerant to be evaporated to gaseous first refrigerant in the cascading heat exchanger (15).

8. The method according to claim 5, wherein first refrigerant is supplied to the low-pressure side via a fourth expander by an adjustable first internal supplementary refrigeration line (37) in the first cooling circuit (11), having a second bypass (38), which is connected to a high-pressure side (21) in the flow direction upstream of the first expanding element (18) and downstream of the condenser (17) and is connected to the low-pressure side (22) in the flow direction upstream of the first compressor (16) and downstream of the cascading heat exchanger (15), and the fourth expander (39).

9. The method according to claim 8, wherein refrigerant is supplied to the low-pressure side via a fifth expander by an adjustable second internal supplementary refrigeration line (40) in the second cooling circuit (12), having a third bypass (41), which is connected to a high-pressure side (29) in the flow direction upstream of the second expander (28) and downstream of the cascading heat exchanger (15) and is connected to the low-pressure side (30) in the flow direction upstream of the second compressor (27) and downstream of the heating exchanger (13), and by the fifth expander (42).

10. The method according to claim 9, wherein first refrigerant is supplied to the low-pressure side via a sixth expander by an adjustable first back-injector (43) for first refrigerant in the first cooling circuit (11), having a fourth bypass (44), which is connected to a high-pressure side (21) in the flow direction downstream of the first compressor (16) and upstream of the condenser (17) and is connected to the low-pressure side (22) in the flow direction upstream of the first compressor and downstream of the cascading heat exchanger (15), and by the sixth expander (45).

11. The method according to claim 10, wherein second refrigerant is supplied to the low-pressure side via a seventh expander by an adjustable second back-injector (46) for second refrigerant in the second cooling circuit (12), having a fifth bypass (47), which is connected to a high-pressure side (29) in the flow direction downstream of the second compressor (27) and upstream of the cascading heat exchanger (15) and is connected to the low-pressure side (30) in the flow direction upstream of the second compressor and downstream of the heat exchanger (13), and by the seventh expander (48).

12. The method according to claim 11, wherein the temperature controller comprises an adjuster having at least one pressure sensor or at least one temperature sensor in cooling circuits (11, 12), and magnetic valves (20) of each expander (18, 28, 36, 39, 42, 45, 48) are actuated by the adjuster as a function of a measured temperature or pressure.

13. The method according to claim 1, wherein a suction gas temperature and/or a suction gas pressure of the first and/or second refrigerant is adjusted on a low-pressure side (22, 30) of the cooling circuits (11, 12) upstream of compressors (16, 27), or in that a difference in pressure is compensated between a high-pressure side (21, 29) and the low-pressure side of the cooling circuits.

14. The method according to claim 1, wherein a temperature ranging from −70° C. to +180° C. is realized within the test space (14) by the temperature controller.

* * * * *

UNITED STATES PATENT AND TRADEMARK OFFICE
CERTIFICATE OF CORRECTION

PATENT NO. : 11,162,714 B2
APPLICATION NO. : 16/444167
DATED : November 2, 2021
INVENTOR(S) : Christian Haack et al.

Page 1 of 1

It is certified that error appears in the above-identified patent and that said Letters Patent is hereby corrected as shown below:

In the Claims

Column 12, Claim 2, Line 18 – please replace "wherein a expander" with --- wherein a third expander ---

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*